United States Patent
Renfrew et al.

[15] 3,704,973
[45] Dec. 5, 1972

[54] ELECTRO-HYDRAULIC MEANS FOR OPENING AND CLOSING INJECTION MOLDS

[72] Inventors: Robert Morrison Renfrew, Bramalea, Ontario; Peter Leon Rees, Don Mills, Ontario, both of Canada

[73] Assignee: Husky Manufacturing & Toolworks, Ltd., Bolton, Ontario, Canada

[22] Filed: June 8, 1971

[21] Appl. No.: 151,107

[52] U.S. Cl. .................. 425/150, 425/154, 425/167, 425/214, 425/242, 425/450
[51] Int. Cl. .................................................. B29f 1/00
[58] Field of Search......425/150, 154, 156, 157, 167, 425/242, 450, 214

[56] References Cited

UNITED STATES PATENTS 3,611,502 10/1971 Florjanic ............................. 425/242
3,604,058 9/1971 Fishback ............................. 425/150
3,579,740 5/1971 Rees .................................... 425/156
3,191,235 6/1965 Rougement ........................ 425/156

Primary Examiner—J. Spencer Overholser
Assistant Examiner—David S. Safran
Attorney—Karl F. Ross

[57] ABSTRACT

The movable platen of an injection-molding machine is rigid with a nonrotatable lead screw engaged by a rotatable drive nut which is splined to a tubular input shaft surrounding the rear end of the lead screw. A cylinder on the machine frame carries an axially movable piston which, upon a stopping of shaft rotation in the mold-closed position, is brought to bear under hydraulic pressure against the nut to clamp the mold between the platens against the tie bars anchored to the frame. The input shaft is powered by a reversible two-speed motor which is switched to low-speed operation in a terminal phase of a lead-screw stroke to absorb excess energy in a nondissipative manner.

10 Claims, 3 Drawing Figures

Robert M. Renfrew
Peter L. Rees
INVENTORS.

BY

Karl F. Ross
Attorney

R. M. Renfrew
Peter L. Rees
INVENTORS.

ELECTRO-HYDRAULIC MEANS FOR OPENING AND CLOSING INJECTION MOLDS

Our present invention relates to a system for opening and closing a split mold of an injection-molding machine, such a mold consisting of two or more separable portions including a substantially stationary platen rigid with the machine bed and a movable platen slidably supported on a set of tie rods anchored to the stationary platen. The "stationary" platen may be limitedly movable, with reference to an adjoining backing plate, for the operation of a protective circuit as described in commonly owned U.S. Pat. Nos. 3,117,348 and 3,254,371.

In commonly owned application, Ser. No. 754,181 filed 21 Aug. 1970 by Herbert Rees, now U.S. Pat. No. 3,579,740, a hydraulic mechanism for reciprocating the movable platen has been disclosed as including a lead screw rigid with that platen and engaged, at a location remote therefrom, by a nut rotatably mounted in the machine frame and driven by a reversible hydraulic motor mounted on that frame. A limited axial mobility of the nut in the frame allows the nut and the lead screw to be driven forward, i.e. in the mold-closing direction, in the final phase of the closure stroke by the application of fluid pressure to a piston mechanically connected therewith, this piston being received in a cylinder on the frame with just enough clearance to permit the high-pressure fluid to exert a clamping thrust upon the movable platen whereby tight closure of the mold is insured. Upon the subsequent reversal of the hydraulic motor to retract the movable platen, a sensitive switch in a narrow gap between nut and piston detects the existence of any bind between the nut and the lead screw and, in such a case, places the piston under reverse fluid pressure to break the bind and to permit free reverse rotation of the nut.

The use of a hydraulic motor for the nut drive is advantageous for heavy-duty equipment and affords a wide stroke range for the reciprocation of the movable platen. Such a system, however, must overcome not only the load inertia but also a considerable inertia — on the same order of magnitude — of the driving unit requiring a high energy input for rapid acceleration. An object of our present invention, therefore, is to provide an improved mechanism of the general type described in which the driving side of the system (i.e. the rotatable nut and its torque generator) are of compact design and relatively low inertia to reduce the energy required for a given production rate or to increase that rate with a predetermined energy input.

A related object is to provide a driving mechanism of this character in which deceleration of the movable platen in a terminal phase of the mold-closing (and preferably also of the mold-opening) stroke is accomplished with recovery of a substantial amount of kinetic energy heretofore wastefully dissipated as heat, thereby maintaining a reduced operating temperature.

We have found, in accordance with this invention, that the desired reduction in input inertia can be realized by positively coupling the rotatable nut with the rotor of an electric drive motor, preferably of the three-phase induction type, whose stator is mounted on the machine frame; such a rotor may simply consist of a short-circuited wound or squirrel-cage armature as is well known per se. In order to decelerate the drive motor in a terminal phase of a reciprocation stroke with minimum thermal dissipation of kinetic energy, the drive motor is switched from a high-speed mode of operation to a low-speed mode of operation so as to act as an electric generator, thereby returning the excess energy to the power supply (e.g. utility mains) used to energize the stator. In the case of a three-phase induction motor, a high-field-velocity and a low-field-velocity constellation of stator windings can be alternately established, for this purpose, with either two separate sets of windings or a single set of such windings connected in either of two ways. Alternatively, a variable-frequency controller may be provided for a frequency responsive AC motor, thereby providing finer or more precise speed regulation, or a phase control system may be used. A preferably magnetic brake, operated by a limit switch in either end position of the movable platen, may act upon the nut, directly or through a member keyed or splined thereto, for fully arresting the rotary drive.

The invention will be described in greater detail with reference to the accompanying drawing in which.

Figure 1:
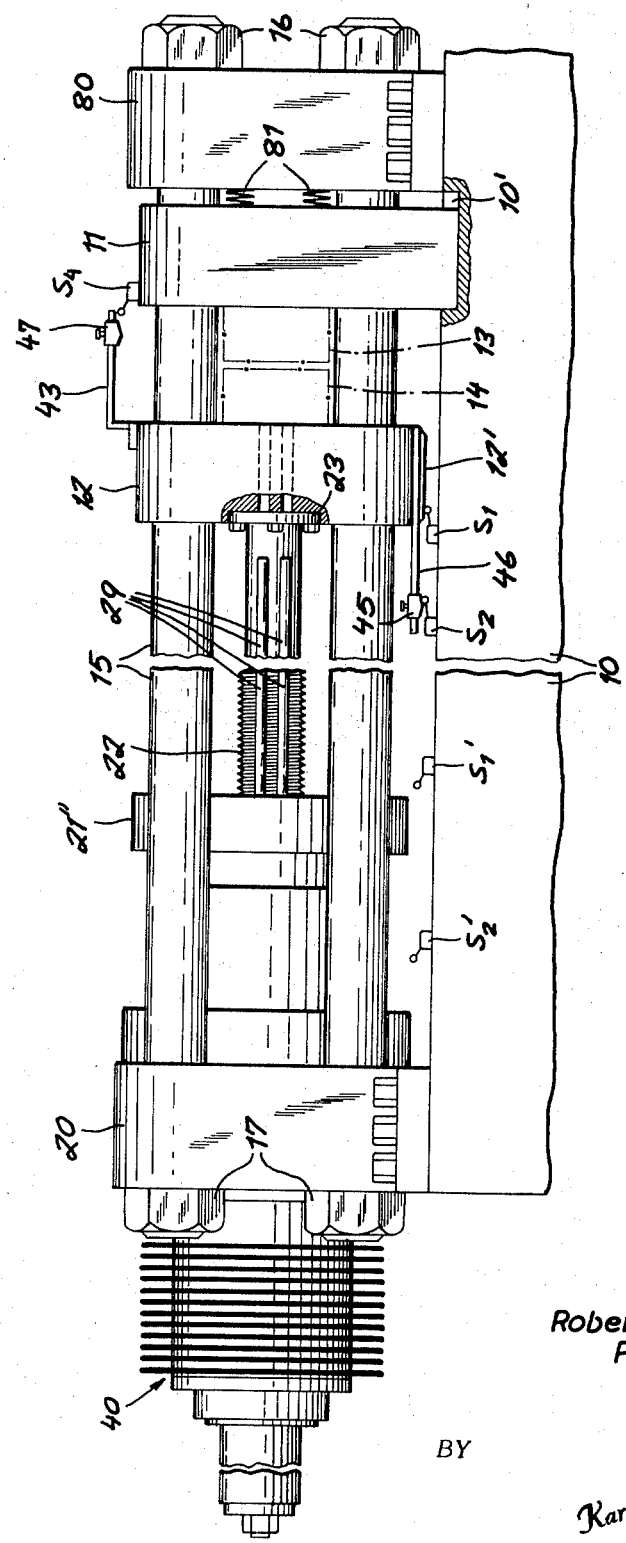
FIG. 1 is a side-elevational view of an injection-molding machine embodying our present invention.

The molding machine shown in the drawing may be of the general type disclosed in the aforementioned prior patents, only so much of the machine being shown as is necessary for an understanding of our invention. The machine comprises a bed 10, forming part of a frame structure, which has keyways 10' (only one shown) accommodating a fixed backing plate 80 and an adjoining substantially stationary platen 11 confronting a movable platen 12. Platens 11 and 12 support respective mold halves 13 and 14, platen 11 being capable of limited axial displacement relative to plate 80 from which it is normally held spaced apart by several compression springs 81. It is also possible to insert a further mold portion between the platen-supported portions 13 and 14, e.g. as disclosed in commonly owned U.S. Pat. Nos. 3,328,844 and 3,383,930.

Figure 3:
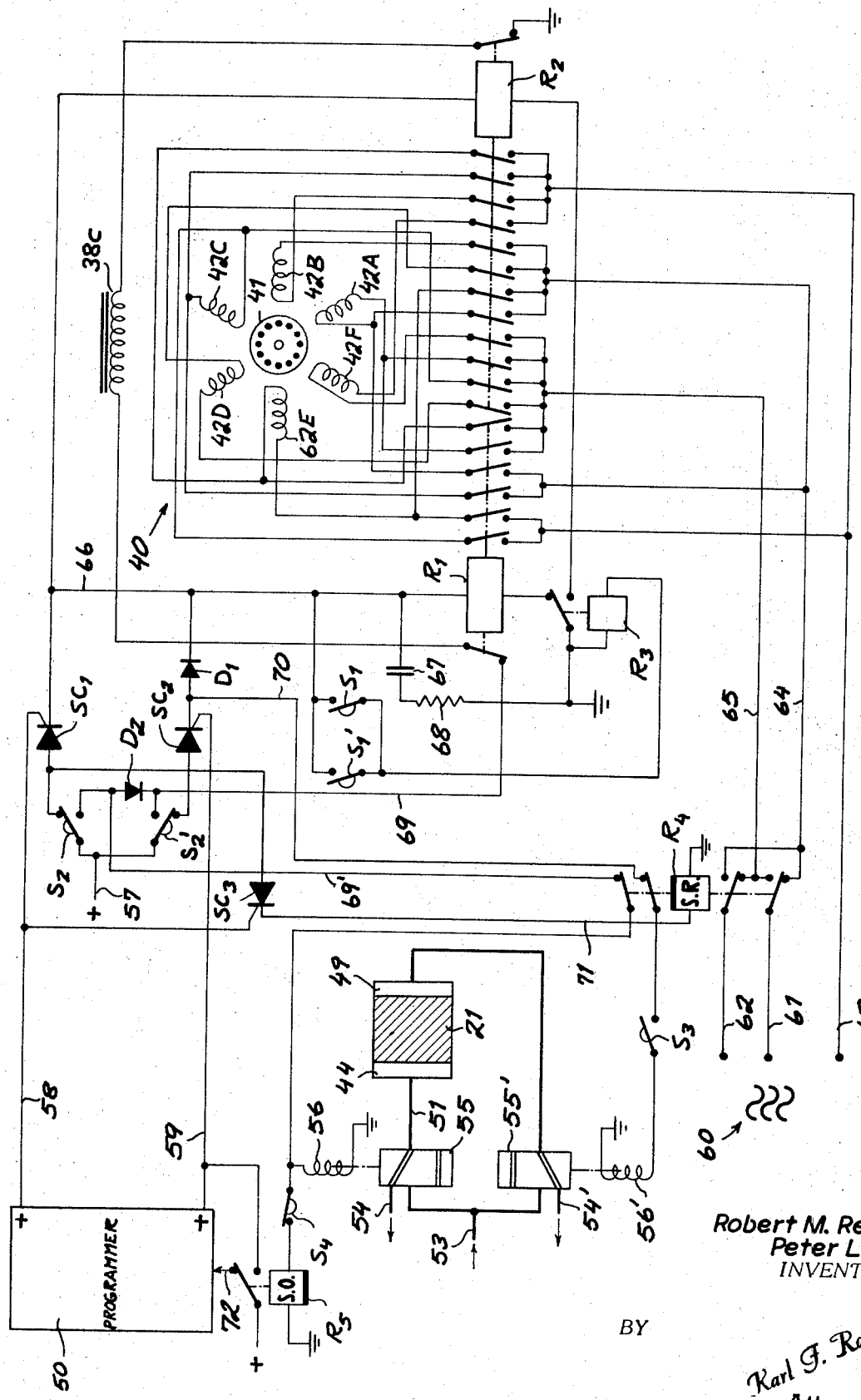
FIG. 3 is a diagram of a control system associated with the machine of FIGS. 1 and 2.

A set of tie bars 15 are anchored by nuts 16 to plate 80 and by nuts 17 to the corners of a square block 20 which is bolted to the bed 10 so as to be rigid with the machine frame. Block 20 forms a cylinder for a piston 21 which coaxially surrounds a lead screw 22 having a front end 23 nonrotatably secured to movable platen 12 for axial reciprocation therewith along the tie bars 15. A nut 24 matingly engages the lead screw 22 and is journaled in a sleeve 25 by means of tapered roller bearings 26, 27. Sleeve 25 is embraced by a tubular extension 21' of piston 21 which in turn is secured by bolts 28 (only one shown) to a cylindrical head 21" serving as a carrier for a set of ejector pins 29. Piston 21 is held against rotation, relative to cylinder block 20, by a set of guide pins 30 (only one shown). A set of spring-loaded studs 31 (only one shown) in an annular casing 32 bear upon the rear face of piston 31 to maintain the same spaced from the adjoining cylinder wall, the resulting gap 44 communicating via a port 57 (see also FIG. 3) with a source of high-pressure fluid. A similar set of pins 33 couples the piston 21 with sleeve 25 for joint rotation with freedom of limited axial displacement, the array of pins 33 (only one shown) being received in aligned bores 33' of piston 21 and 33" of sleeve 25. At one or more points of the array, a bore 33' is omitted and the corresponding bore 33" is occupied by a shorter pin 34 pressed by a spring 35 against the front face of the piston 21 to maintain a small clearance 48 between the piston and the nut 24. The front face of piston 21 is separated from the adjoining cylinder wall by another gap 49 communicating with the fluid source by way of a port 52 as also indicated in FIG. 3.

Nut 24 has a tubular forward extension 24' spacedly surrounded by a flat ring 36 which is bolted to piston extension 21'. Ring 36, in its turn, is embraced with clearance by a collar 37 which has an internal flange 37' splined to the extension 24' for joint rotation with nut 24. Ring 36 and collar 37 carry two sets of interleaved annular foils 38a, 38b which form part of an electromagnetic brake 38 and are bracketed by axially spaced annular pole pieces 38', 38" adjoining the core of an electromagnetic coil 38c (FIG. 3). Advantageously, the foils of one set (e.g. 38a) are nonmagnetic whereas those of the other set (38b) are highly permeable; with brake jaw 38' axially movable relatively the jaw 38", energization of coil 38c moves these jaws towards each other to clamp the foils therebetween.

The opposite, rear end of nut 24 forms a skirt 24" internally splined to a tubular shaft 39 encasing the lead screw 22. The shaft 39 is journaled in a rearward extension 20' of block 20 by means of ball bearings 18a, 18b and supports an armature 41 of an induction motor generally designated 40; the corresponding stator 42 is integral with the cylindrical bearing support 20' and is connectable to a source of three-phase current in a manner more fully described hereinafter with reference to FIG. 3.

Figure 2:
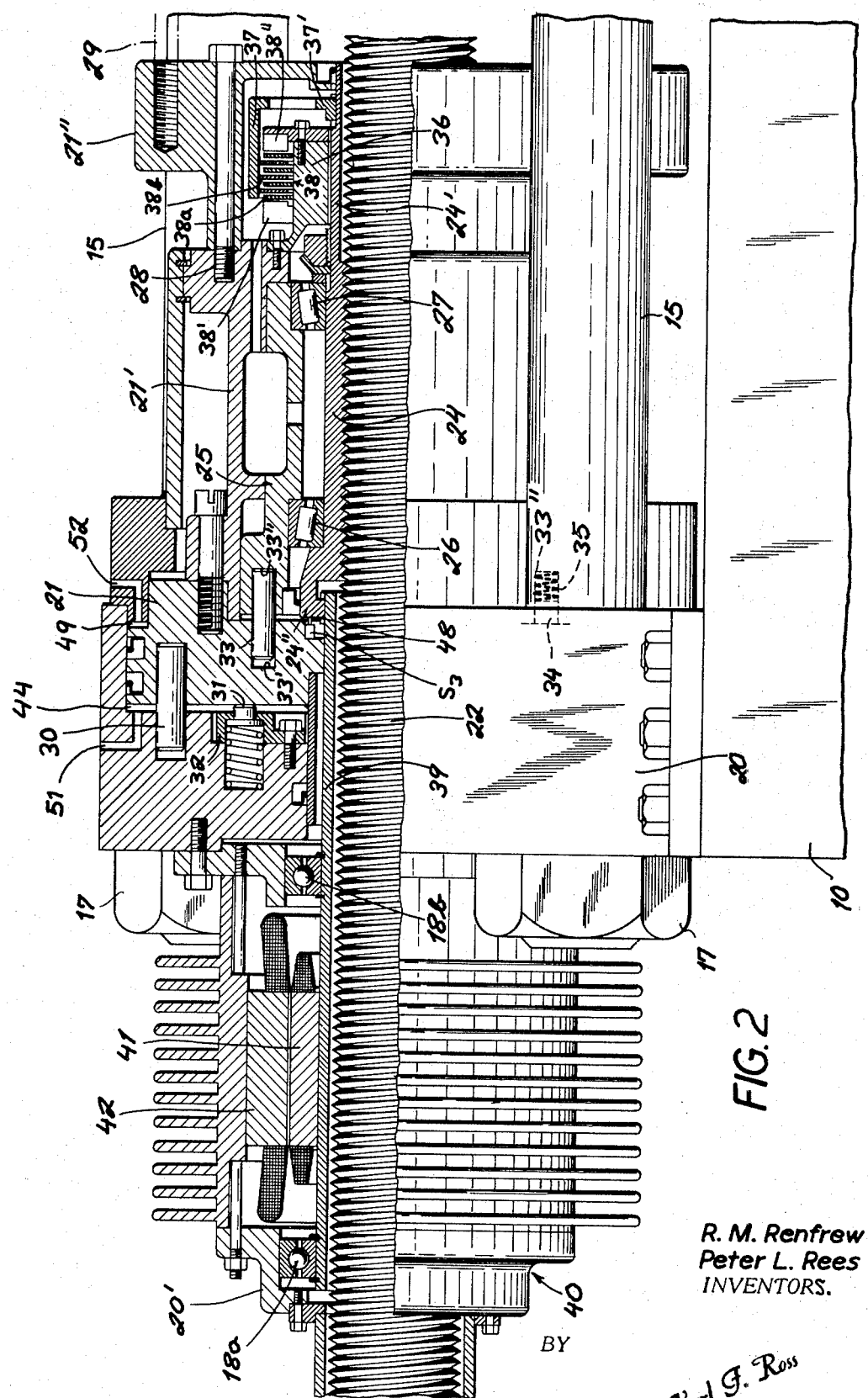
FIG. 2 is a sectional view showing part of the assembly of FIG. 1 on a larger scale.

Mounted on the bed 10 of the machine are a set of microsensitive switches $S_1$, $S_1'$, $S_2$, $S_2'$; switches $S_1$ and $S_1'$ coact with a cam 12' on platen 12 whereas switches $S_2$ and $S_2'$, laterally offset therefrom, can be tripped by a cam 45 adjustably mounted on a rod 46 which extends axially from platen 12. A further sensitive switch $S_3$ on piston 21 (FIG. 2) co-operates with the end face of skirt 24" of nut 24 to detect the disappearance of clearance 48. A mold-protection switch $S_4$, carried on stationary platen 11, is trippable by a cam 47 which is adjustably mounted on an arm 43, rigid with platen 12, for operation upon complete closure of the mold 13, 14 carried by the platens. Switch $S_1$ is so positioned as to be tripped by the cam 12' during a terminal phase of the forward stroke of platen 12, i.e. in the last stage of the rightward movement of that platen (as viewed in FIGS. 1 and 2) to close the mold 13, 14. Switch $S_2$ is depressed by the cam 45 just before the two mold halves contact each other. Similarly, switch $S_1'$ is operated by the cam 12' in the terminal phase of the mold-opening or rearward stroke (to the left of FIGS. 1 and 2) whereas switch $S_2'$ responds to the arrival of the platen in its fully withdrawn position. Cams 45 and 47 are adjustable to allow for molds of different depths; the bed-mounted switches could, of course, also be capable of such adjustment if necessary.

The operation of our system will now be described with reference to FIG. 3 which shows, in addition to some of the elements already discussed, a programmer 50 for the initiation of the mold-opening and mold-closing strokes under normal operating conditions. Also shown in FIG. 3 are a supply conduit 53 for hydraulic liquid originating at a high-pressure pump or a pressure accumulator not shown; a pair of conduits 54, 54' for the return of hydraulic liquid to a reservoir or the low-pressure side of the pump; hydraulic valves 55, 55' controlled by respective solenoids 56, 56'; several controlled rectifiers or thyristors $SC_1$, $SC_2$, $SC_3$; and a number of relays $R_1$, $R_2$, $R_3$, $R_4$, $R_5$ which are shown as of the electromagnetic type but may also be in the form of electronic switches as is well known *per se*.

The stator of induction motor 40 is here shown, by way of example, as comprising six peripherally spaced field windings 42A, 42B, 42C, 42D, 42E and 42F which are connectable, via respective armatures of relays $R_1$ and $R_2$, in two different Δ circuits across bus bars 61, 62, 63 of a three-phase power supply 60. In the unoperated state of relay $R_4$, bus bars 61 and 62 are connected to respective leads 64 and 65; with relay $R_4$ operated, these connections are reversed. Relays $R_1$ and $R_2$ are connected in parallel to a lead 66 in the output circuits of thyristors $SC_1$ and $SC_2$, the latter being in cascade with a diode $D_1$. Switches $S_2$ and $S_2'$, when in their normal position, connect the anodes of these thyristors to a source of positive potential via a lead 57, their gates being tied to a pair of conductors 58, 59 emanating from programmer 50. Relay $R_3$, serving to switch the output of thyristor $SC_1$ or $SC_2$ from relay $R_1$ to relay $R_2$, has its circuit connected to conductor 66 by way of normally open switches $S_1$ and $S_1'$ in parallel. Conductor 66 is also connected to ground through a condenser 67, in series with a resistor 67, serving to prevent cutoff of the conducting thyristor $SC_1$ or $SC_2$ at the instant of operation of switchover relay $R_3$. of Solenoid 56 is connected through an armature and front contact of relay $R_4$, which is of the slow-releasing type, to a branch 69' of a conductor 69 which is energized from input lead 57 upon reversal of either switch $S_2$ or $S_2'$; branch 69' joins that conductor at a point ahead of a diode $D_2$ isolating it from switch $S_2'$. Another armature and back contact of relay $R_4$ connects solenoid 56', via the normally open switch $S_3$ and a lead 70, to the cathode of thyristor $SC_2$ ahead of diode $D_1$. Relay $R_4$ is energized by way of a lead 71 in the conductive state of thyristor $SC_3$ whose input connections are in parallel with those of thyristor $SC_1$. Relay $R_5$ is of the slow-operating type, with an operating delay somewhat less than the release delay of relay $R_4$, and is connected in parallel with solenoid 56 via normally closed mold-protection switch $S_4$. An armature and front contact of relay $R_5$ serve to apply positive potential to lead 59 under certain conditions explained below.

Brake winding 38c is connected between ground and conductor 69 in series with respective armatures and back contacts of relays $R_1$ and $R_2$.

Let us assume that the platen 12 is fully retracted, with the mold 13, 14 wide open, and that a new molding cycle is about to begin. Limit switch $S_2'$ is reversed so as to energize the conductor 69, whereby brake 38 (FIG. 2) is operated. As soon as programmer 58 emits a positive pulse on lead 58, thyristors $SC_1$ and $SC_3$ conduct to operate relays $R_1$ and $R_4$; relay $R_1$ interrupts the brake circuit through coil 38c so as to release the rotor 41 of polyphase motor 40 for entrainment by the rotating field of its stator. Relay $R_1$ has six armatures and front contacts which, with relay $R_4$ operated, connect winding 42A across leads 61 and 62, winding 42C across leads 62 and 63, and winding 42E across leads 63 and 61. Windings 42A, 42C and 42E, spaced 120 electrical and geometrical degrees apart, thus generate a field which rotates at a speed corresponding to the frequency of source 60 to entrain the shaft 39 and thereby the nut 24 in a sense advancing the lead screw 22 and the movable platen 12 to the right in FIGS. 1 and 2. This high-speed rotation endures until the cam 12' closes the switch $S_1$ with consequent energization of switchover relay $R_3$. Relay $R_1$ now releases and relay $R_2$ attracts its armatures to connect windings 42A and 42D in parallel across leads 61 and 62, windings 42B and 42E in parallel across leads 62 and 63, and windings 42C and 42F in parallel across windings 63 and 61. This halves the speed of rotation of the stator field so that motor 40 operates as a generator, converting excess kinetic energy into electric energy which is returned to the supply network 60. The platen 12 therefore decelerates as it approaches its limiting position of mold closure.

Just before the mold closes, cam 45 reverses the switch $S_2$ so that thyristors $SC_1$ and $SC_3$ are cut off, deenergizing relays $R_2$, $R_3$ and $R_4$. During the short interval of continuing operation of slow-releasing relay $R_4$, solenoid 56 is actuated to shift the valve 55 from its illustrated normal position in which (like valve 55') it is held by a spring not shown. Oil under pressure now enters the space 44 to the rear of piston 21 and displaces it toward the right (FIG. 2), thereby first eliminating the clearance 48 to close the switch $S_3$ which, however, is without effect at this time. The advancing piston then shifts the arrested nut 24 together with lead screw 22 and platen 12 further to the right, completing the closure of the mold if such closure is not prevented by the presence of some foreign body (e.g. a fragment of a previously molded article) between mold halves 13 and 14. If the mold closes properly, protective switch $S_4$ is opened before the relay $R_5$ has time to operate in parallel with solenoid 56. Under these conditions, programmer 50 initiates the operation of the injection piston (not shown) of the machine and, after a predetermined cooling period, applies a short positive pulse to lead 59 so as to fire the thyristor $SC_2$. Relay $R_1$ responds as before to deactivate the brake 38 but, since reversing relay $R_4$ has meanwhile released, now causes the sequential energization of windings 42A, 42C and 42E in the reverse order to invert the sense of rotation of rotor 41. At the same time a test circuit is established via conductor 70 and switch $S_3$ to determine whether the nut 24 is free to rotate or whether a bind has developed at its point of contact with piston 21; if such a bind exists, switch $S_3$ remains closed and solenoid 56' operates to displace the valve 55' into its alternate position to admit oil into the gap 49 at the front face of the piston 21, thereby shifting the piston to the left with draining of space 44 inasmuch as valve 55 had been restored to normal upon the release of relay $R_4$. This piston movement reestablishes the clearance 48 and reopens the switch $S_3$ whereupon nut 24 rotates at high speed to retract the lead screw 22 and the platen 12 toward their mold-open position. In the terminal phase of this withdrawal stroke, cam 12' trips the switch $S_1'$ to reoperate the relay $R_3$ with consequent switchover of the stator of motor 40 from high-field-velocity operation to low-field-velocity operation through the actuation of relay $R_2$ in lieu of relay $R_1$. Again, the excess kinetic energy released in the slowdown of nut rotation is converted into electric energy fed back to the power supply 60. Finally, cam 45 reverses the switch $S_2'$ to re-energize the brake winding 38c concurrently with the quenching of thyristor $SC_2$ and the resulting release of relay $R_2$. A new cycle can then be initiated by the programmer.

If the mold-protection switch $S_4$ had not been opened in time, relay $R_5$ would have briefly energized the conductor 59 to fire the thyristor $SC_2$ ahead of time, with simultaneous deenergization of a lead 72 to inform the programmer 50 that injection was to be skipped in this cycle. An alarm lamp or the like, not shown, could also have been turned on at that point to apprize the operator of the malfunction, giving him an opportunity to arrest the machine and to remove the interfering matter.

Naturally, the number of stator windings or poles could be altered at will to provide, if desired, a different speed ratio for driving and deceleration. It will also be apparent that two separate sets of windings could be made operative by relays $R_1$ and $R_2$, respectively, and that the rotor 41 may in such case have a single armature coacting with both windings or a pair of mechanically interconnected armatures individual thereto.

We claim:

1. In an injection-molding machine comprising a frame, a substantially stationary platen on said frame adapted to support a first mold portion, a set of tie bars rigid with said frame having forward ends anchored to said stationary platen, and a movable platen slidable along said tie bars and adapted to support a second mold portion, the combination therewith of mechanism for reciprocating said movable platen on said tie bars between an advanced position of mold closure and a retracted position of mold opening, said mechanism comprising:

a lead screw parallel to said tie bars, said lead screw having a rear end remote from said platens and a front end nonrotatably secured to said movable platen for axial reciprocation therewith;

a nut threadedly engaging said lead screw, said nut being rotatably mounted on said frame, reversible electric drive means with a relatively high and a relatively low operating speed for rotating said nut to advance and retract said lead screw together with said movable platen; and switchover means controlled by said lead screw for operating said drive means at said relatively high speed over the major part of a reciprocating stroke of said movable platen and for switching to low-speed operation in a terminal phase of such stroke to decelerate said nut with reconversion of kinetic to electric energy.

2. The combination defined in claim 1 wherein said nut and said drive means are mounted on said frame with limited axial mobility, further comprising actuating means operable by fluid pressure, upon deactivation of said drive means in said advanced position of said movable platen, to bear upon said nut and said drive means in a forward direction for clamping said mold portions tightly between said platens, said actuating means including a cylinder formed by said frame and a non-rotatable piston in said cylinder operatively engaging said nut.

3. The combination defined in claim 1 wherein said drive means comprises a rotor coaxial with said nut and positively coupled therewith for joint rotation, and a stator on said frame surrounding said rotor.

4. The combination defined in claim 3 wherein said rotor is provided with a tubular extension engaging said nut with freedom of relative axial displacement.

5. The combination defined in claim 2, further comprising brake means on said frame for arresting said rotor and switch means effective in a limiting position of said movable platen for actuating said brake means.

6. The combination defined in claim 5 wherein said brake means comprises a tubular member embracing said nut with relative axial mobility and coupled therewith for joint rotation, and coacting elements on said piston and said member.

7. The combination defined in claim 6 wherein said coacting elements are two sets of interleaved annular foils, said brake means further comprising electromagnetic coil means for exerting a clamping pressure upon said foils.

8. The combination defined in claim 1 wherein said drive means comprises a polyphase alternating-current motor with a plurality of stator windings alternately connectable by said switch means to a polyphase power supply for energization in a high-field-velocity constellation with a relatively small number of poles and in a low-field-velocity constellation with a relatively large number of poles.

9. The combination defined in claim 1 wherein said switchover means comprises a pair of switches on said frame positioned to be tripped by said movable platen upon its approach of said advanced and said retracted position, respectively.

10. The combination defined in claim 1, further comprising protective switch means actuatable by said platens in said advanced position upon complete mold closure, programming means for normally reversing said drive means after a predetermined injection interval, and circuit means effective in said advanced position in the unactuated state of said protective switch means for immediately reversing said drive means.

* * * * *